US008949606B2

(12) United States Patent
Schachtner et al.

(10) Patent No.: US 8,949,606 B2
(45) Date of Patent: Feb. 3, 2015

(54) PREVENTION OF MASQUERADE BY USING IDENTIFICATION SEQUENCES

(75) Inventors: Sven Schachtner, Eitensheim (DE); Thomas Bizenberger, Braunschweig (DE); Bernhard Gstoettenbauer, Engerwitzdorf (AT)

(73) Assignees: Audi AG, Ingolstadt (DE); Volkswagen AG, Wolfsburg (DE); TTTech Computertechnik AG, Vienna (AT)

( * ) Notice: Subject to any disclaimer, the term of this patent is extended or adjusted under 35 U.S.C. 154(b) by 157 days.

(21) Appl. No.: 13/384,489

(22) PCT Filed: Jun. 18, 2010

(86) PCT No.: PCT/EP2010/003698
§ 371 (c)(1),
(2), (4) Date: Apr. 2, 2012

(87) PCT Pub. No.: WO2011/006575
PCT Pub. Date: Jan. 20, 2011

(65) Prior Publication Data
US 2012/0191888 A1 Jul. 26, 2012

(30) Foreign Application Priority Data
Jul. 14, 2009 (DE) .................. 10 2009 033 241

(51) Int. Cl.
H04L 9/32 (2006.01)
H04L 29/06 (2006.01)
(Continued)

(52) U.S. Cl.
CPC ....... *H04L 63/12* (2013.01); *H04L 2012/40273* (2013.01); *H04L 12/40* (2013.01); *H04L 1/0061* (2013.01)
USPC ............................ 713/170; 713/168; 713/181

(58) Field of Classification Search
CPC ............... H04L 12/40071; H04L 12/40143; H04L 12/407; H04L 12/40084; H04L 12/40163; H04L 12/40169; H04L 12/4013; H04L 12/4135; H04L 63/12; H04L 1/0061; H04L 12/40; H04L 2012/40215; H04L 2012/40241; H04L 2012/40267; H04L 2012/40273
USPC ......................................... 713/168, 170, 181
See application file for complete search history.

(56) References Cited

U.S. PATENT DOCUMENTS

2005/0131852 A1* 6/2005 Berwanger et al. ............... 707/1
2007/0192668 A1 8/2007 Hrebek et al.
(Continued)

FOREIGN PATENT DOCUMENTS

DE 10 2004 036 810 3/2006
DE 102009033241.3 7/2009
(Continued)

OTHER PUBLICATIONS

Bosch, CAN Specification Version 2.0, 1991, pp. 1-73, http://www.bosch-semiconductors.de/media/pdf_1/canliteratur/can2spec.pdf.*
(Continued)

*Primary Examiner* — Andrew Goldberg
*Assistant Examiner* — Forrest Carey
(74) *Attorney, Agent, or Firm* — Staas & Halsey LLP

(57) ABSTRACT

A method transmits a message between a transmitter and a receiver on a bus using an identifier associated with the transmitter/receiver path for the purpose of authentication and a message counter. The identifier is dynamically selected from an identification sequence depending on the message counter value and is integrated into the message check sum but not transmitted via the bus. A control device and a vehicle are adapted to carry out the method for transmitting a message.

13 Claims, 2 Drawing Sheets

(51) Int. Cl.
*H04L 1/00* (2006.01)
*H04L 12/40* (2006.01)

(56) References Cited

U.S. PATENT DOCUMENTS

| | | | |
|---|---|---|---|
| 2008/0137540 A1* | 6/2008 | Botvich | 370/241 |
| 2008/0320307 A1* | 12/2008 | Zhang et al. | 713/170 |
| 2009/0010258 A1* | 1/2009 | Ayoub et al. | 370/392 |
| 2009/0234514 A1* | 9/2009 | Becker et al. | 701/1 |

FOREIGN PATENT DOCUMENTS

| | | |
|---|---|---|
| WO | 2009/057941 | 5/2009 |
| WO | PCT/EP2010/003698 | 6/2010 |

OTHER PUBLICATIONS

International Search Report for PCT/EP2010/003698, mailed on Feb. 14, 2011.

German Office Action for German Priority Application No. 10 2009 033 241.3, issued on Apr. 14, 2010.

International Preliminary Report on Patentability for PCT/EP2010/003698, mailed on Jan. 26, 2012.

Chinese Office Action issued Jan. 6, 2014 in Chinese Patent Application No. 201080031671.4.

\* cited by examiner

PREVENTION OF MASQUERADE BY USING IDENTIFICATION SEQUENCES

CROSS REFERENCE TO RELATED APPLICATIONS

This application is based on and hereby claims priority to International Application No. PCT/EP2010/003698 filed on Jun. 18, 2010 and German Application No. 10 2009 033 241.3 filed on Jul. 14, 2009, the contents of which are hereby incorporated by reference.

BACKGROUND

The invention relates to methods for transmitting a message between a transmitter and a receiver on a bus. The invention also relates to a control device and a vehicle which are set up to carry out the method for transmitting a message.

In order to protect data communication, the IEC 61508 safety standard requires proof that undetected failures of the communication process are estimated taking into account supposed error scenarios.

In this case, the measures are at the application level and protect the data from the safety-oriented data source to the data sink (so-called end-to-end protection). When considering errors, it is also necessary to estimate, inter alia for the masquerade error scenario, the likelihood of there being an undetected error in the communication process.

The AUDI communication model provides a system based on FlexRay and CAN. A plurality of safety-relevant communication paths can be used in a parallel manner in the communication system. In addition to the active participants in safety-oriented communication, other safety-relevant and non-safety-relevant communication paths are also present. A data-receiving participant in safety-oriented communication may only use the data received from the transmitter relevant to the participant, otherwise there is an undetected masquerade error.

The expression "masquerade" means that the true contents of a message are not correctly identified. For example, a message from an unsafe participant is incorrectly identified as a message from a safe participant.

In the case of a masquerade, the receiver thus assesses a non-authentic message as authentic. In this case, an authentic message means that the message is valid and its information was generated by an authenticated transmitter. The masquerade is usually caused by incorrect routing of a correct message, in which case transmission control devices, the gateway or else the receiver control device can effect the incorrect routing for the safety function under consideration. Errors which result in a masquerade can be divided into the three categories: random hardware faults, systematic software errors and random bit errors on the bus.

Masquerade caused by random hardware faults can be assessed as a requirement imposed on data communication by IEC 61508-2. If any form of data communication is used when performing a safety function, the likelihood of undetected failure of the communication process must be estimated. In this case, transmission errors, repetitions, loss, insertions, incorrect sequence, corruption, delay and masquerade must be taken into account. This likelihood must be taken into account when estimating the likelihood of the dangerous failure of the safety function on account of random hardware failures.

Systematic software errors, for instance as a result of an incorrect configuration, should be precluded by the development process and software or integration tests, in particular in the safety-oriented software of the transmitter and receiver with the end-to-end protection. There is no need to calculate a likelihood of occurrence since these errors occur in a determinate manner and not stochastically.

Random bit errors on the bus may result in incorrect interpretation of the information in the useful data, for instance owing to corruption of the message identifier in CAN and the receiver-selective message evaluation. A transmission code (TC1) for detecting bit errors on the bus has already been provided, according to the protocol, in the bus systems considered for this document. Bit errors which corrupt the message packets fall into the corruption error pattern according to the classification in IEC 61508-2. Bit errors on the bus would be decisive for the masquerade error pattern only when they relate to the identifier, for example in CAN, and the transmission code of the protocol would not detect them with sufficient likelihood.

The following is considered to be a fundamental prerequisite for all safety-oriented systems in the vehicle: partial or complete failure or intermittent or permanent disruption in communication must not lead to a safety-relevant vehicle state.

Requirements are defined for reliably detecting transmission errors in communication. For this purpose, additional information (message counter, checksum) is added to the actual useful data of the transmitter. This information is evaluated in the receiver. In this case, protection is effected end-to-end, that is to say from the safety-oriented software in the transmitter control device to the safety-oriented software in the receiver control device. The data packets generated by the application (safety protocol data units: S-PDUs) thus include useful data and redundancy for error detection.

When using a CRC-8 checksum, there is a maximum number of 256 identifiers for the unambiguous detection of masquerade. The identifier 0 is reserved for those messages which do not require any protection against masquerade. 255 unique identifiers thus remain for allocation to messages which need to be protected against masquerade, equivalent to just as many transmitter/receiver paths.

In the case of qualified errors in the receiver, the useful data or signals are not transferred to the safety-oriented software of the safety function. The safety functions are designed in such a manner that the "safe state timeout" fallback level is assumed in the case of intermittent or permanent disruption. Errors in the signals or useful data which remain undetected during evaluation can sometimes lead to the dangerous incident since the safety-oriented software interprets the incorrect data as valid and builds the calculations or decisions thereon.

SUMMARY

One potential object is to make it possible to detect incorrectly routed messages within the vehicle network when using a CRC-8 checksum for a number of more than 255 transmitter/receiver paths. In this case, there should be no need for any additional bus bandwidth for a protection mechanism and conformity with the safety requirements imposed on data communication from the relevant safety standards should be ensured.

In order to make it possible for a receiver to detect non-authentic messages (for example incorrectly routed messages), the protection concept proposed by the inventors provides for the use of an identifier at the transmitter end, the identifier changing dynamically on the basis of a message counter (BSZ). Each transmitter thus uses an identifier sequence. These dynamics in the identifier at the transmitter end make it possible—with the same range of values for the identifier (downward compatibility with the identifier concept according to the related art)—to distinguish more transmitters. The identifier space is thus expanded without an additional bus load. Static single-byte identifiers were previously used for each transmitter.

In a method for transmitting a message between a transmitter and a receiver using a message counter and a system for authenticating transmitter/receiver paths, the system for authenticating transmitter/receiver paths has identifier sequences having a plurality of identifiers, and an identifier is selected from the identifier sequences on the basis of the message counter.

The previously static single-byte identifier is thus preferably dynamically selected from an identifier sequence on the basis of the message counter value.

The identifier is preferably used to calculate the checksum.

For each transmitter/receiver path, the associated identifier sequence should preferably be stored in the transmitter and in the receiver.

In a further preferred manner, a message counter containing a plurality of values in the form of bits is used, two arbitrary identifier sequences having a matching identifier for a maximum of one value of the message counter.

In addition, an identifier sequence preferably has different identifiers for all values of the message counter (at all preferred 16 positions).

In particular, an identifier is used for non-safety-relevant messages, and the identifier sequences do not contain the identifier in the form of the identifier value for non-safety-relevant messages for any value of the message counter. In a further preferred manner, the identifier for non-safety-relevant messages is the value 0 and an identifier sequence does not contain the value 0 for any value of the message counter (at any of the preferred 16 positions).

A control device and/or a vehicle is/are set up to carry out one of the methods described above.

In summary, the invention has the following advantages:

With an unchanged range of values for the application checksum, the dynamic identifier makes it possible to protect several thousand messages in the network interconnection.

There is no need to change the message layout.

Consequently, there is no increase in the bus load.

The protection concept meets the requirements with regard to data communication in current safety standards and in the future automotive standard ISO 26262.

BRIEF DESCRIPTION OF THE DRAWINGS

These and other objects and advantages of the present invention will become more apparent and more readily appreciated from the following description of the preferred embodiments, taken in conjunction with the accompanying drawing of which.

DETAILED DESCRIPTION OF THE PREFERRED EMBODIMENT

Figure 1:
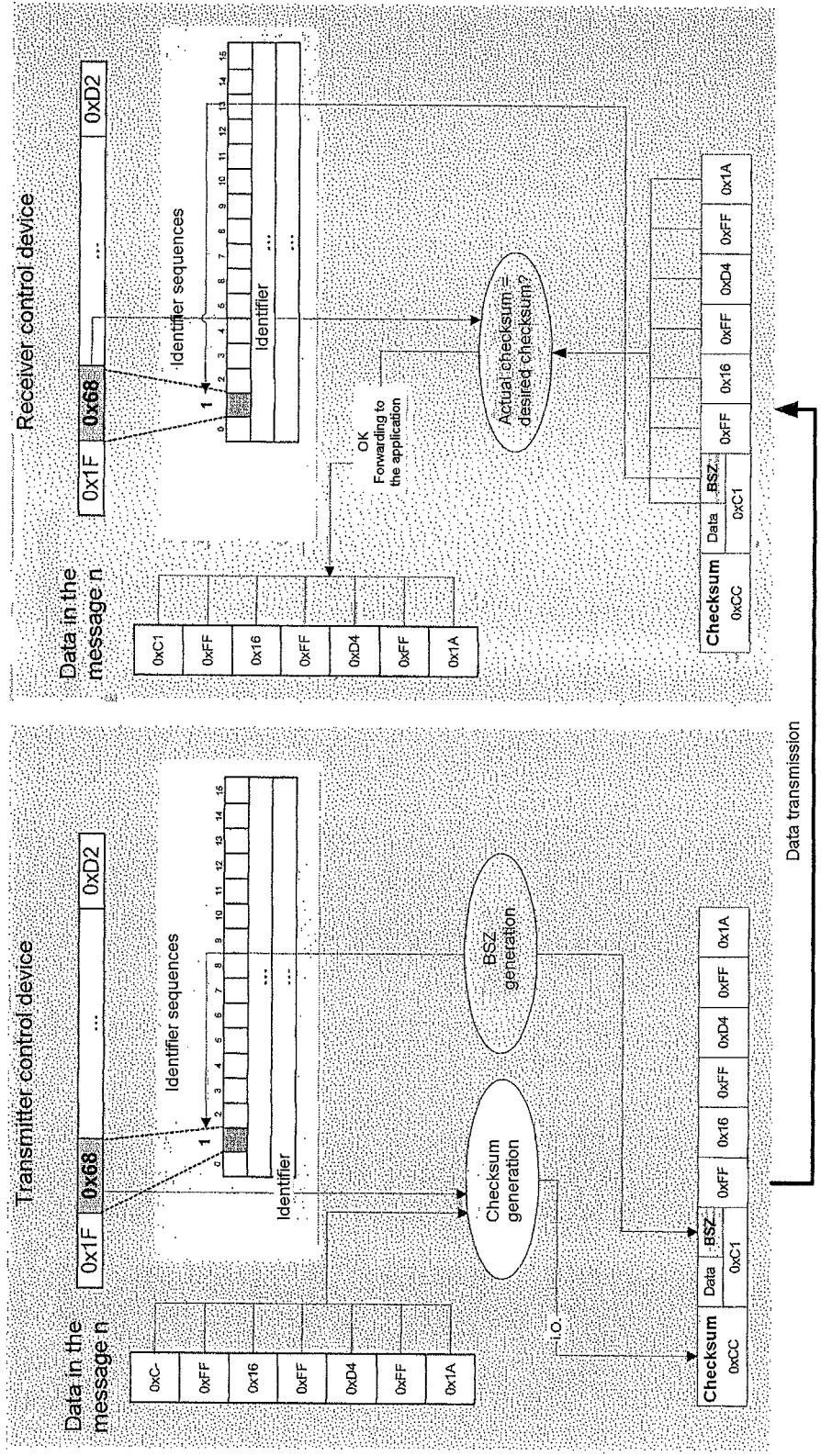
FIG. 1 illustrates the implementation of message protection using a dynamic identifier in the transmitter.
Figure 2:
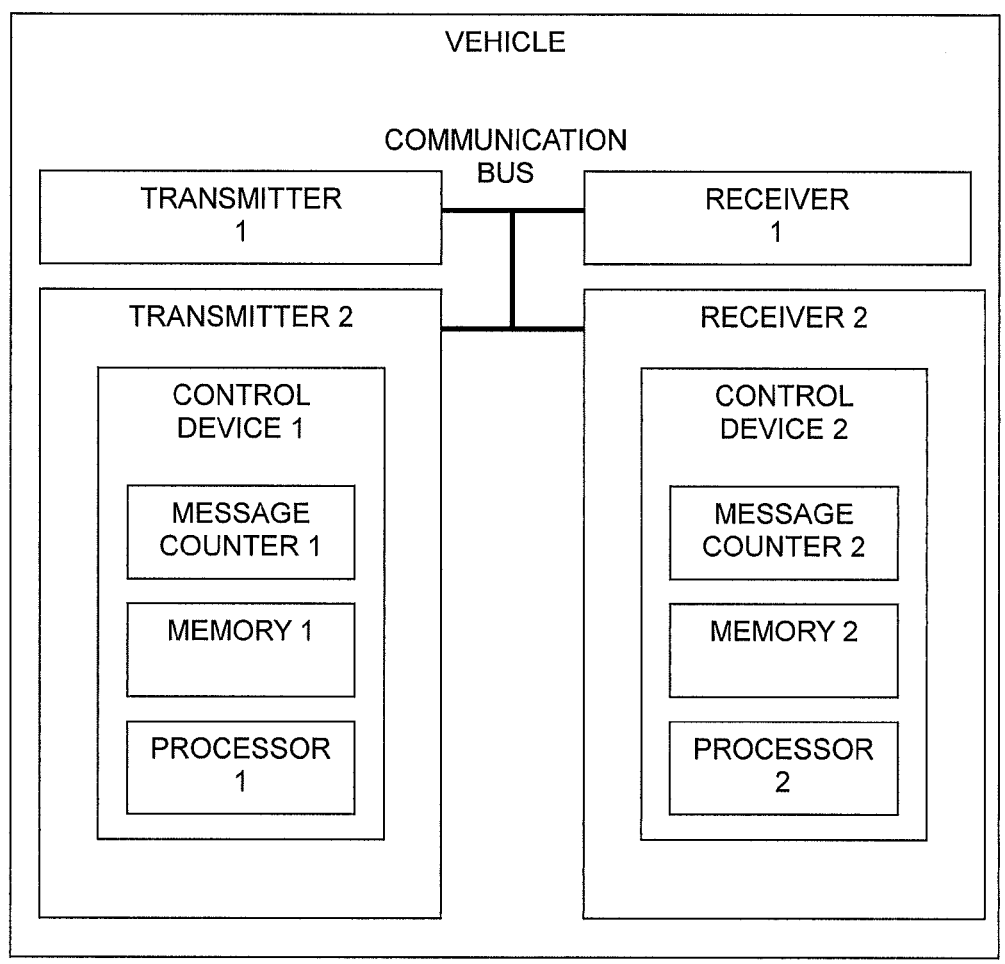
FIG. 2 illustrates a vehicle communications system.

Reference will now be made in detail to the preferred embodiments of the present invention, examples of which are illustrated in the accompanying drawing.

In order to transmit messages on a bus, an application prepares useful data from consistent signals for cyclical transmission. A message counter (BSZ) and a CRC-8 checksum are added to the useful data in order to protect against transmission errors. The S-PDU generated in this manner is then transferred from the application to the standard software and is transferred to a communication controller (CC) for transmission.

In the existing method for protecting against masquerade, a static message identifier which is dependent on the transmitter/receiver path is included, after the useful data to be protected, both in the transmitter and in the receiver in order to calculate the CRC checksum. However, the message identifier is not transmitted via the bus and is thus not part of the protected message. The message identifiers for all messages to be received are known a priori to each receiver. The correct assignment of message identifier to message takes place across the network and is ensured by the original equipment manufacturer.

The receiver application cyclically checks whether there is a new message. Every received message is checked for plausibility and the data are forwarded to the application of the safety function only if they are valid. The plausibility check is carried out by checking the CRC checksum and checking the plausibility of the BSZ value. A BSZ value is considered to be valid when it has been increased by a $BSZ_{delta}$ value, which depends on the time difference, in comparison with the counter reading of the message last qualified as valid: the further back in time the last message reception qualified as valid, the greater the maximum difference from the currently received BSZ may be. The range of allowed $BSZ_{delta}$ values is referred to as the BSZ validity range. Messages with BSZ outside this BSZ validity range are labeled invalid. Message reception with the same BSZ value as the message last qualified as valid results in a detected repetition ($BSZ_{delta} = 0$) and the message is labeled invalid.

The CRC calculation method and the generator polynomial are the same for all messages in the network interconnection. The unique calculation rule is defined in the requirement specification of the original equipment manufacturer. In addition to the CRC checksum, there are messages with an XOR checksum from previous protection methods. The message identifier is permanently predefined for every safety-relevant message and does not change over time. A CRC checksum having x bits has a range of values of $2^x$ and consequently a maximum of $2^x$ different message identifiers can be uniquely mapped to the CRC checksum in a reversible manner. In this case, different identifiers always result in different values of the CRC. This property is guaranteed with the specific selection of the generator polynomial. If the message identifier of the transmitter is different from the message identifier of the receiver, but there are otherwise no bit errors, the error is completely detected.

This results in a maximum number of 256 identifiers for the unambiguous detection of masquerade by the selected CRC-8 checksum. The identifier 0 is reserved for those messages which do not require any protection against masquerade. 255 unique identifiers thus remain for allocation to messages which need to be protected against masquerade, equivalent to just as many transmitter/receiver paths.

With the first detected CRC error in a terminal 15 cycle, the received message is labeled invalid and the "safe state timeout" fallback level is assumed as a precautionary measure for immediate consequential errors. The system returns to the normal operating state only when a particular number of messages within n evaluation cycles have been qualified as valid.

The first message is used to initialize the BSZ validity range and is not valid.

With the second detected CRC error within a terminal 15 cycle, the "safe state checksum" fallback level is assumed and is maintained for the entire terminal 15 cycle.

Expansion to more than 255 transmitter/receiver paths (S-PDUs) protected against masquerade is necessary, and masquerade errors are intended to be reliably detected, with the result that dangerous incidents on account of masquerade do not exceed the limit value for safety integrity level 3 (SIL3) of the IEC-61508 standard.

Owing to the required compatibility with control devices which are already in production, the already existing safety code CRC-8, the message layout and the static message identifiers which have already been allocated are intended to be retained. The bandwidth available for signals is not intended to become narrower, that is to say expansion to a CRC-12 or a CRC-16 is not desirable. The new masquerade concept is intended to be an extension of the proof which has already been provided. Advantages of the new concept for protecting against masquerade are thus:

- a considerably larger number of protected transmitter/receiver paths,
- a simple process when allocating the message identifiers,
- the limit value for SIL3 is complied with,
- extension of the proof which has already been provided,
- retention of the generator polynomial for the CRC-8 checksum,
- the same bandwidth for signals,
- an unchanged message layout,
- backward compatibility with the previous concept, and
- applicability to asynchronous transmitters and/or receivers.

FIG. 1 illustrates the implementation of message protection using a dynamic identifier in the transmitter.

Only an understanding of the message identifier to be allowed for, which is consistent with the transmitter, is essential for the CRC evaluation in the receiver. The new concept provides an identifier sequence and builds on the requirement imposed on the receiver application that at least two undetected erroneous messages are necessary for a dangerous incident.

The previously static identifier (remaining the same over time) is extended to an identifier sequence of 16 identifiers. The identifier to be used from the identifier sequence is selected on the basis of the BSZ value in the received message.

For each transmitter/receiver path in the network, one of N identifier sequences is allocated for the messages, uniquely labeled $K_{idx}=\{1, 2, \ldots, N\}$. In this case, each identifier sequence includes 16 identifiers, subsequently uniquely labeled $k_{i,0}, k_{i,1}, \ldots, k_{i,15}$ for $K_{idx}=i$.

The allocated identifier sequences comply with the properties of the following necessary conditions. In this case, conditions 1 to 5 relate to the generation of the identifiers but conditions 6 to 8 relate to the allocation process.

Condition 1: the previous static message identifiers correspond to the special cases of static identifier sequences with matching values at the 16 positions. Backward compatibility with the static identifiers is thus ensured. For $K_{idx}=i\in\{0, 1, \ldots, 255\}$, $k_i=i=k_{i,0}=\ldots=k_{i,0}=\ldots=k_{i,15}$ for each static message identifier.

Condition 2: two arbitrary identifier sequences may have a matching identifier for a maximum of one BSZ value (at a maximum of one position).

For $K_{idx}=i$, $j\in\{0, 1, \ldots, N\}$, $i\neq j$ and $m, n\in\{0, 1, \ldots, 15\}$, where $m\neq n$, the following applies:

If $k_{i,m}=k_{j,m}$, it follows that $k_{i,n}\neq k_{j,n}$.

Condition 3: a dynamic identifier sequence must have different identifiers for all BSZ values (at all 16 positions).

For $K_{idx}=i\in\{256, 257, \ldots, N\}$ and $m, n\in\{0, 1, \ldots, 15\}$, where $m\neq n$, the following applies: $k_{i,m}\neq k_{i,n}$.

Condition 4: a dynamic identifier sequence must not contain the value 0 for any BSZ value (at any of the 16 positions).

For $K_{idx}=i\in\{256, 257, \ldots, N\}$ and $m\in\{0, 1, \ldots, 15\}$, the following applies: $k_{i,m}\neq 0$.

Condition 5: the structure of the list of dynamic identifier sequences must not have a regularity which can be reproduced for expected random hardware faults. The structure of the identifier table is intended to be similar to allocation by a stochastic process.

No identifier must occur with significant accumulation. In addition, there must be no simple or directly discernible relationship between the identifiers within the identifier sequences, that is to say only one "intelligent error" may result in a valid identifier sequence.

This condition is ensured by the algorithm for determining the identifier sequences.

Condition 6: an identifier sequence can be allocated for a particular S-PDU length only when the identifier sequence results in 16 CRC checksums, which all differ (in pairs if desired), with useful data which remain the same but a continuous BSZ.

For $K_{idx}=i\in\{0, 1, \ldots, N\}$, message counter $m, n\in\{0, 1, \ldots, 15\}$, $m\neq n$ and $r\in\{1, \ldots, 40\}$, the following applies: $CRC(m, db_2, \ldots, db_r, k_{i,m})\neq CRC(n, db_2, \ldots, db_r, k_{i,n})$.

In this case, $CRC(\cdot)$ denotes the function for calculating the CRC-8 checksum of the data bytes $db_1=m$ to $db_r$.

Condition 7: a dynamic identifier sequence can be allocated for a particular S-PDU length only when the identifier sequence results in 16 CRC checksums, which match the 16 XOR checksums at a maximum of one position (that is to say for one BSZ value), with any desired useful data which remain the same but with a continuous BSZ.

For $K_{idx}=i\in\{256, 257, \ldots, N\}$, $m, n\in\{0, 1, \ldots, 15\}$, $m\neq n$ and $r\in\{1, \ldots, 40\}$, the following applies:

If $CRC(m, db_2, \ldots, db_r, k_{i,m})=XOR(m, db_2, \ldots, db_r, k_{XOR})$, it follows that $CRC(n, db_2, \ldots, db_r, k_{i,n})\neq XOR(n, db_2, \ldots, db_r, k_{XOR})$.

In this case, $CRC(\cdot)$ denotes the function for calculating the CRC-8 checksum, $XOR(\cdot)$ denotes the function for calculating the XOR checksum and $k_{XOR}$ denotes an arbitrary static identifier of the XOR checksum.

Condition 8: any identifier sequence may be allocated only once for a particular S-PDU length. An exception is the static identifier 0 which may be repeatedly allocated for non-safety-relevant messages.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for transmitting a message between a transmitter and a receiver of a plurality of transmitters and receivers, comprising:
    using a message counter to count messages and produce a message counter value;

assigning, by a microprocessor, to each transmitter/receiver path a corresponding sequence of identifiers unique to the transmitter/receiver path;

for each message, dynamically selecting, by the microprocessor, an identifier from the sequence of identifiers corresponding to the transmitter/receiver path, the selected identifier being chosen based on the message counter value, wherein each message counter value is a different identifier from the sequence of identifiers;

using, by the microprocessor, the selected identifier to calculate a checksum for authentication; and validating, by the microprocessor, the message counter value based on a previous message counter value and a time difference from production of the previous message counter value to production of the current message counter value, wherein the sequence of identifiers is stored in the transmitter and the receiver prior to the selection of the identifier from the sequence of identifiers.

2. The method according to claim 1, wherein a list of assigned sequences of identifiers is available to the transmitter and the receiver.

3. The method according to claim 1, wherein a list of assigned sequences of identifiers is stored in both the transmitter and the receiver.

4. The method according to claim 3, wherein two arbitrary sequences of identifiers have a matching identifier for a maximum of one message counter value.

5. The method according to claim 3, wherein each sequence of identifiers uses different identifiers for all message counter values.

6. The method according to claim 3, wherein a non-safety identifier is used for non-safety-relevant messages,
the sequences of identifiers are used for safety-relevant messages, and
the sequences of identifiers do not contain the non-safety identifier for any message counter value.

7. The method according to claim 3, wherein a plurality of bits is used to form the message counter value.

8. The method according to claim 7, wherein two arbitrary sequences of identifiers have a matching identifier for a maximum of one message counter value.

9. The method according to claim 8, wherein each sequence of identifiers uses different identifiers for all message counter values.

10. The method according to claim 9, wherein a non-safety identifier is used for non-safety-relevant messages,
the sequences of identifiers are used for safety-relevant messages, and
the sequences of identifiers do not contain the non-safety identifier for any message counter value.

11. The method according to claim 1, wherein a plurality of bits is used to form the message counter value.

12. A control device comprising:
a message counter to count messages and produce a message counter value;
a memory to store a sequence of identifiers unique to a corresponding transmitter/receiver path; and
a microprocessor to:
dynamically select, for each message, an identifier from the sequence of identifiers corresponding to the transmitter/receiver path, the selected identifier being chosen based on the message counter value, wherein each message counter value is a different identifier from the sequence of identifiers;
use the selected identifier to calculate a checksum for authentication; and
validate the message counter value based on a previous message counter value and a time difference from production of the previous message counter value to production of the current message counter value,
wherein the sequence of identifiers is stored in the transmitter and the receiver prior to the selection of the identifier from the sequence of identifiers.

13. A vehicle comprising:
a plurality of transmitters;
a plurality of receivers;
a communication bus having a plurality of transmitter/receiver paths;
a control device provided in at least some of the transmitters and receivers, the control device comprising:
a message counter to count messages and produce a message counter value;
a memory to store a sequence of identifiers unique to a corresponding transmitter/receiver path; and
a microprocessor to:
dynamically select, for each message, an identifier from the sequence of identifiers corresponding to the transmitter/receiver path, the selected identifier being chosen based on the message counter value, wherein each message counter value is a different identifier from the sequence of identifiers;
use the selected identifier to calculate a checksum for authentication; and
validate the message counter value based on a previous message counter value and a time difference from production of the previous message counter value to production of the current message counter value,
wherein the sequence of identifiers is stored in the transmitter and the receiver prior to the selection of the identifier from the sequence of identifiers.

* * * * *

UNITED STATES PATENT AND TRADEMARK OFFICE
CERTIFICATE OF CORRECTION

| | | |
|---|---|---|
| PATENT NO. | : 8,949,606 B2 | Page 1 of 1 |
| APPLICATION NO. | : 13/384489 | |
| DATED | : February 3, 2015 | |
| INVENTOR(S) | : Sven Schachtner et al. | |

It is certified that error appears in the above-identified patent and that said Letters Patent is hereby corrected as shown below:

In the Claims

Column 7, line 22, in Claim 2, delete "and the receiver" insert -- and to the receiver --, therefor.

Signed and Sealed this
Twelfth Day of May, 2015

Michelle K. Lee
*Director of the United States Patent and Trademark Office*